Nov. 2, 1943.　　W. J. McDERMOTT　　2,333,264
SAND BLAST NOZZLE
Filed Feb. 21, 1942
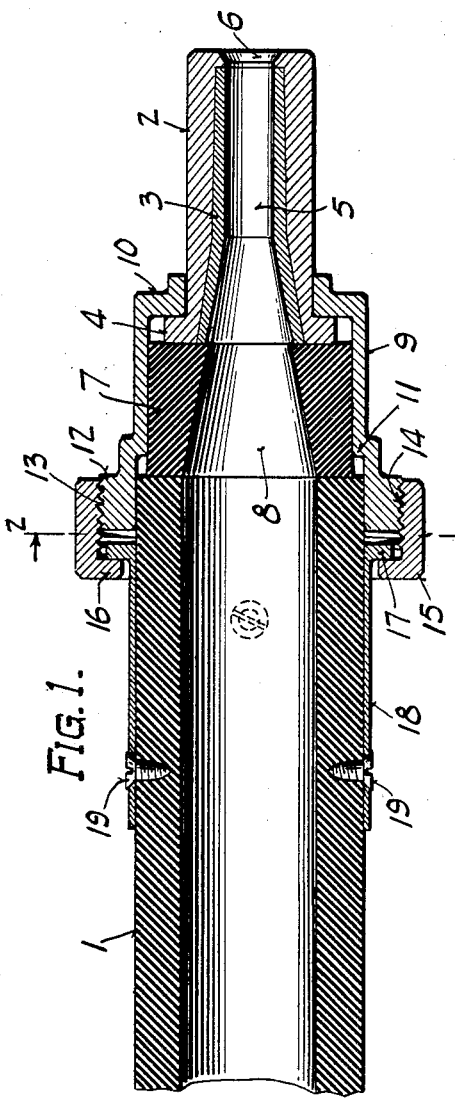
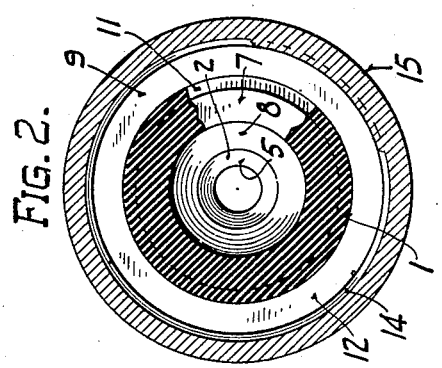
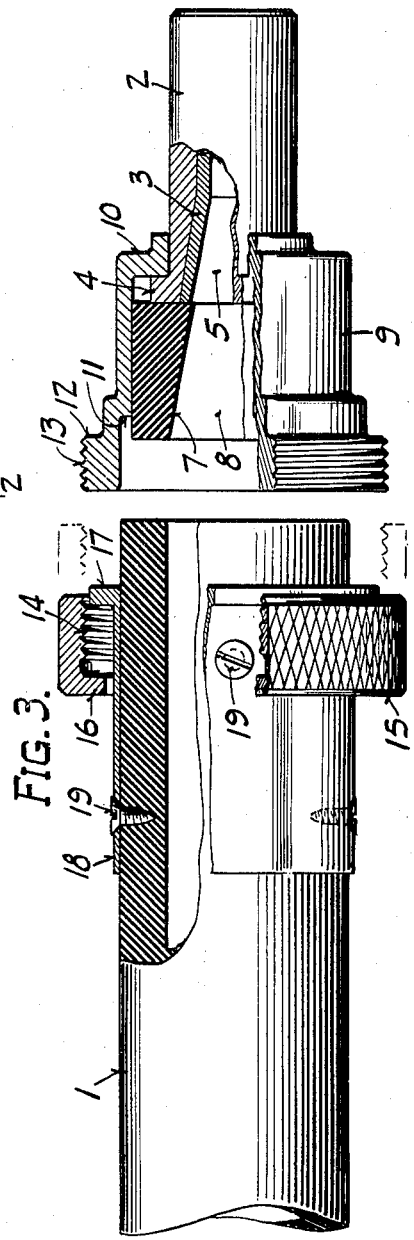
Walter J. McDermott
INVENTOR.
BY *Elwin C. Andrus*
ATTORNEY.

Patented Nov. 2, 1943

2,333,264

UNITED STATES PATENT OFFICE 2,333,264

SANDBLAST NOZZLE

Walter J. McDermott, Milwaukee, Wis., assignor to A. O. Smith Corporation, Milwaukee, Wis., a corporation of New York Application February 21, 1942, Serial No. 431,778

8 Claims. (Cl. 51—11)

This invention relates to a sand blast nozzle and an assembly thereof.

Heretofore difficulty has been experienced in assembling a nozzle employed in sand blast operations with the air hose that carries the sand to the nozzle. In previously known nozzle assemblies the rubber ring disposed between the free end of the air hose and the nozzle became distorted and twisted out of shape upon assembly of the apparatus. Under these circumstances, the rubber is soon worn away in service, misalignment then occurs and this causes the sand passing through the apparatus to impinge against the inner edge of the hard lining of the nozzle and to spall away the lining and render the nozzle worthless in a short time.

The principal object of the present invention is to remedy these difficulties and provide a connection between a hose and nozzle that eliminates misalignment and prevents the spalling away of the lining of the nozzle by sand or other material passing therethrough.

Another object is to provide a nozzle which may be easily and quickly assembled and disassembled without the use of tools.

Other objects will appear in the following description of an embodiment of the invention illustrated in the accompanying drawing.

In the drawing:

Figure 1 is a full sectional view of a sand blast nozzle assembly embodying the invention;

Fig. 2 is a section taken on line 2—2 of Fig. 1; and

Fig. 3 is an elevational view partly in section of the hose assembly and the nozzle assembly positioned for attachment.

Referring to the drawing, the sand blast nozzle illustrated comprises a tubular high pressure air hose 1 preferably of rubber, to the free end of which is secured the nozzle 2.

The nozzle 2 is of suitable metal with the interior portion preferably cast with exceedingly hard metal 3 to better enable the nozzle to withstand abrasion by the sand passing therethrough. The outer surface of the nozzle is generally cylindrical in shape and its rear end portion is provided with the outwardly extending flange 4.

Similarly the bore of the nozzle 2 is preferably cylindrical but the cross-sectional area of the passage 5 provided in the nozzle gradually decreases in its extent from the flange 4 to a line located slightly to the rear of the center of the nozzle. From this location to the front end of the nozzle 2 the cross-sectional area of the passage 5 is preferably the same in extent except for the slight outwardly tapered portion 6 at the extreme outer end of the nozzle.

The ring 7 is disposed against the flange 4 between and in alignment with the nozzle 2 and the air hose 1. The ring 7 is preferably of hard corrosion resistant rubber and its outer surface is substantially cylindrical. The interior surface of the ring 7 is conical and provides a passage 8 that gradually decreases in cross-sectional area in its extent from the rear to the front end of the ring. By making the ring 7 compressible and resilient, tight joints having a uniform longitudinal pressure throughout the circumference are provided between the respective ends of the ring and the hose and nozzle. This prevents sand from working into the joints.

Although the passage 8 through the ring 7 is aligned with the passage 5 that extends through the nozzle 2, the cross-sectional area of the passage 8 at the outer end of the ring where it joins the passage 5 is preferably less than the cross-sectional area of the passage 5 at the inner end of the nozzle 2. This manner of construction prevents the sand or grit passing through the apparatus from striking against and wearing away the inner edge of the nozzle 2.

The ring 7 is enclosed by the bushing sleeve 9, the latter being of irregular shape and having a cross-sectional area that increases in the extent from the front to the rear end of the sleeve. The front end of the sleeve 9 is provided with the inwardly extending flange 10, against the inner surface of which is disposed the flange 4 of the nozzle 2. The increase in cross-sectional area in the central portion of the sleeve 9 is provided by the shoulder 11 and the rear end of the sleeve 9 has the outwardly extending flange 12.

The flange 12 is substantially cylindrical and is provided on its outer surface with the threads 13 which mesh into the threads 14 disposed throughout a substantial portion of the internal surface of the collar 15.

The rear end of the collar 15 comprises the inwardly extending flange 16 which rests against the flange 17 provided at the front end of the sleeve 18. The sleeve 18 is generally cylindrical in shape and encircles the air hose 1 for a substantial extent spaced from its end, two or more wood screws 19 preferably being provided to secure the sleeve and hose together.

In assembling the sand blast nozzle apparatus described, the nozzle 2 is first slipped through the inside of the sleeve 9 until the flange 4 of the nozzle engages the inner side of the flange 10. The ring 7 is then forced into the bore of the sleeve 9 until the front end of the ring is disposed against the inner side of the flange 4 of the nozzle.

The collar 15 is next assembled with the sleeve 18 by slipping the collar over the rear end of the sleeve and thence toward the front flanged end of the sleeve. The sleeve 18 is then slipped onto the free end of the air hose. To gauge the position of the sleeve on the hose the rear end of the hose is inserted into the sleeve 9 into contact with the ring 7 and the flange 17 slightly spaced from the flange 12. While in this position the wood screws 19 are inserted through holes provided in the sleeve 18 and screwed into the hose 1 to hold the sleeve positioned on the hose.

The nozzle assembly and the hose assembly are now complete and the two are assembled by forcing the air hose 1 into the sleeve 9 against the rubber ring 7 and threading the collar 15 onto the flange 12 of the sleeve 9. As the collar 15 is threaded onto the flange 12 the hose 1 contacting the ring 7 is forced forward, compressing and expending the ring and the forward end of the hose to effect a tight coupling of the members.

To facilitate ready compression of the hose end and rubber ring 7 and to provide the tight closure desired longitudinal clearances are provided between the ring 7 and the flange 10, the end of hose 1 and the shoulder 11, and the flange 17 and the flange 12, respectively.

The present invention provides a sand blast nozzle in which the parts are readily secured in alignment and in which sand does not spall away the nozzle. The life of the nozzle is thus prolonged as well as that of the parts assembled with it, as the sand, grit or other material employed is always guided in an even course through the apparatus and enters the nozzle in a proper incident manner. There is no twisting of the ring 7 when assembling the coupling, and the ring therefore makes uniform pressure contact with the inner end of the nozzle and the end of the hose.

Various embodiments of the invention may be employed within the scope of the accompanying claims.

I claim:

1. A coupling for a sand blast nozzle assembly having an air hose and a nozzle provided with a flange at its rear end, and a resilient ring disposed between said hose and nozzle in longitudinal alignment therewith, said coupling comprising a metallic sleeve secured to the free end of said hose and having an outwardly extending flange disposed at its front end, a sleeve of similar material encasing said resilient ring and provided with external threads at one end and a flange at the other end to engage and interlock with the flange on said nozzle, a substantially narrow collar having an inwardly extending flange at one end to engage and interlock with the flange on said first named sleeve and threads disposed internally on the unflanged portion to engage the threads disposed on the last named sleeve, the threading of the collar onto the last named sleeve effecting a longitudinal compression of the resilient ring without relative rotational movement of the latter, to provide a secure coupling of the hose, ring and nozzle and with their respective internal passages in concentric alignment.

2. A sand blast nozzle assembly comprising a high pressure air hose and a substantially cylindrical nozzle having an outwardly extending flange at its rear end and an internal passage that decreases in cross-sectional area in the extent of the latter from the front end to the rear end of said nozzle, a generally cylindrical rubber ring disposed between said hose and nozzle and having an internal passage that gradually decreases in cross-sectional area from the hose end to the nozzle end thereof, the said nozzle end having a substantially lesser cross-sectional area than that of the rear part of the passage of said nozzle, a generally cylindrical sleeve enclosing said rubber ring and having an inwardly extending flange at the front end to engage the flange on said nozzle in interlocking engagement and an outwardly extending flange at the rear end provided with a plurality of threads on its outer surface, a generally cylindrical sleeve enclosing and secured to the free end of said hose with an outwardly extending flange disposed at its front end, and a collar with an inwardly extending flange to engage the flange on said last named sleeve, and being provided with threads on the inner surface of the unflanged portion to thread the collar into the threads of the first named sleeve, to compress the rubber ring and securely hold the respective parts of the sand blast nozzle together in proper alignment.

3. A coupling for a sand blast nozzle assembly having an air hose and a nozzle provided with a flange at its rear end, and a resilient ring disposed between said hose and nozzle in longitudinal alignment therewith, said coupling comprising a metallic sleeve secured to the free end of said hose and having an outwardly extending flange disposed at its front end, a sleeve of similar material encasing said resilient ring and provided with external threads at one end and a flange at the other end to engage and interlock with the flange on said nozzle, a substantially narrow collar having an inwardly extending flange at one end to engage and interlock with the flange on said first named sleeve and threads disposed internally on the unflanged portion to engage the threads disposed on the last named sleeve, the threading of the collar onto the last named sleeve effecting a longitudinal compression of the resilient ring without relative rotational movement of the latter, to provide a secure coupling of the hose, ring and nozzle and with their respective internal passages in concentric alignment, said first named sleeve having a circumferential shoulder providing an air space at the end of the hose for radial expansion of the resilient ring.

4. A sand blast nozzle coupling comprising a metallic nozzle, a supply hose, a compressible member disposed between the inner end of said nozzle and the end of said hose and having an internal diameter decreasing from that of the hose at the end in contact therewith to at least that of the nozzle at the end in contact therewith, and threaded male and female coupling sleeves housing said compressible member and encircling circumferential flanges on the nozzle and hose, respectively, to provide freedom of rotation of said sleeves during threading without disrupting the alignment of said nozzle, hose and member and providing a uniform longitudinal pressure contact between said parts throughout their circumference.

5. A sand blast nozzle coupling comprising a metallic nozzle, a supply hose, a compressible member disposed between the inner end of said nozzle and the end of said hose and having an internal diameter substantially decreasing from that of the hose at the end in contact therewith to at least that of the nozzle at the end in contact therewith, a female housing sleeve rotatably secured to said hose, a male housing sleeve rotatably secured to said nozzle and threaded into said female housing sleeve, and longitudinal clearances provided at the end of the hose and the larger cross-sectional area of the nozzle to provide for expansion of the compressible member during coupling of the male and female housing sleeves and thereby provide a tight fit between said member and the adjacent hose and nozzle.

6. In a sand blast nozzle of the type described, a wear resistant packing ring of substantial length disposed between the end of a supply hose and the end of an outlet nozzle and abutting the same in substantial alignment therewith, said ring having an internal diameter less than that of the nozzle at their respective abutting faces.

7. A sand blast nozzle coupling comprising a nozzle member having an external circumferential flange at its rear end, a supply hose of substantially larger diameter than said nozzle and having an external circumferential flange at its forward end, a compressible tubular member extending between the rear end of said nozzle and the forward end of said hose and having a tapered inner diameter and a substantially uniform outer diameter, the inner diameter of said member at the nozzle end being substantially smaller than that of the rear end of the nozzle and the outer diameter of the member at the nozzle end being substantially larger than the outer diameter of said nozzle flange, the inner diameter of said member at the hose end being as great as that of the forward end of the hose and the outer diameter of the member at the hose being substantially less than the outer diameter of the hose, a coupling sleeve fitting said member and having an internal flange at its forward end and interlocking with the nozzle flange to leave an annular space around said nozzle flange at the end of said member for expansion of the latter under longitudinal compression, said coupling sleeve having an enlarged rear end fitting over said hose and providing an annular space surrounding the rear end of said member for expansion of the latter at said end and having an externally threaded flange at its rear end, and an internally threaded sleeve threaded to said threaded flange of said coupling sleeve and having an internal flange at its rear end interlocking with the flange on the forward end of said hose.

8. In a sand blast nozzle, a nozzle member, a supply hose, an intermediate connecting compressible tubular member having an inside diameter less than that of said nozzle, and a pair of threaded coupling sleeves having internal end flanges overlapping and engaging corresponding external flanges on said nozzle member and hose to interlock the same together, said coupling sleeves being free to rotate relative to said nozzle member and hose and providing at each end of said tubular member an annular space for relieving the compression of the latter.

WALTER J. McDERMOTT.